(12) United States Patent
Zammit-Mangion et al.

(10) Patent No.: US 7,158,052 B2
(45) Date of Patent: Jan. 2, 2007

(54) METHOD AND SYSTEM FOR MONITORING THE PERFORMANCE OF AN AIRCRAFT DURING TAKE OFF

(75) Inventors: David Zammit-Mangion, Mellieha (GB); Martin Ewart Eshelby, Rushden (GB)

(73) Assignee: Cranfield University, Bedford (GB)

( * ) Notice: Subject to any disclaimer, the term of this patent is extended or adjusted under 35 U.S.C. 154(b) by 87 days.

(21) Appl. No.: 10/479,108

(22) PCT Filed: May 21, 2002

(86) PCT No.: PCT/GB02/02199

§ 371 (c)(1),
(2), (4) Date: Aug. 2, 2004

(87) PCT Pub. No.: WO02/097764

PCT Pub. Date: Dec. 5, 2002

(65) Prior Publication Data
US 2004/0260434 A1    Dec. 23, 2004

(30) Foreign Application Priority Data
May 24, 2001    (GB)    ................................ 0112545.9

(51) Int. Cl.
*G08B 21/00*    (2006.01)
(52) U.S. Cl. .................. 340/959; 340/970; 701/15; 701/16

(58) Field of Classification Search ............... 340/945, 340/959, 963, 970, 971, 972, 980; 701/15, 701/16; 73/178 T
See application file for complete search history.

(56) References Cited

U.S. PATENT DOCUMENTS

| | | | |
|---|---|---|---|
| 3,865,071 A | 2/1975 | Manor | 116/282 |
| 4,106,730 A * | 8/1978 | Spitzer et al. | 244/183 |
| 4,837,695 A | 6/1989 | Baldwin | 701/15 |
| 4,843,554 A * | 6/1989 | Middleton et al. | 701/15 |
| 5,047,942 A * | 9/1991 | Middleton et al. | 701/15 |
| 5,124,700 A | 6/1992 | Bonafé | 340/959 |
| 5,353,022 A | 10/1994 | Middleton et al. | 340/959 |
| 5,892,462 A * | 4/1999 | Tran | 340/961 |
| 6,088,654 A * | 7/2000 | Lepere et al. | 701/301 |
| 6,408,258 B1 * | 6/2002 | Richer | 702/182 |

\* cited by examiner

*Primary Examiner*—Van T. Trieu
(74) *Attorney, Agent, or Firm*—Pollack, P.C.; Grant E. Pollack

(57) ABSTRACT

A system, method and display for monitoring the performance of an aircraft during the take-off maneuver that includes the steps of monitoring the progress of the take-off maneuver by acquiring data representative of the aircraft's motion at a plurality of points during the maneuver, generating a function that best fits the acquired data, and using the generated function to predict future progress of the maneuver.

25 Claims, 5 Drawing Sheets

METHOD AND SYSTEM FOR MONITORING THE PERFORMANCE OF AN AIRCRAFT DURING TAKE OFF

FIELD OF THE INVENTION

The present invention relates generally to avionics and, more particularly, to a method, system and device for monitoring performance of aircraft or the like.

Most aircraft are designed to operate over a wide range of environmental and operational conditions that may affect their performance. In practice, changes in these conditions combine to produce a statistical variation between the expected performance and the performance actually achieved. For instance, a minimum performance threshold is typically associated with the successful completion of an aircraft's takeoff within selected constraints imposed by the runway. Hence, the actual performance achieved by the aircraft is often critical to flight safety.

In order to ensure safety, regulations governing airworthiness of aircraft state that "The aeroplane shall be capable of taking off assuming the critical power-unit to fail . . . ",. Therefore, large transport aircraft, i.e., those certified under JAR/FAR, part 25 must demonstrate that the takeoff maneuver can be completed safely, or can be terminated in a safe manner, should engine failure occur at any time during takeoff. Generally speaking, the process of performance scheduling, which ensures that the space required for the maneuver is not greater than the space available, is designed to meet this requirement.

During takeoff, an aircraft typically accelerates down the runway to a speed at which it can generate sufficient lift so as to become airborne, and to climb upwardly and away from the airfield at a relatively safe gradient. Should engine failure occur during takeoff, however, the pilot must either continue the takeoff run or abort the takeoff altogether, depending upon the speed and position of the aircraft on the runway. If engine failure occurs early in the takeoff run, then the speed of the aircraft will be sufficiently low so that the safest option will be to terminate the takeoff run and bring the aircraft to a halt within the stopping distance available on the runway. If, on the other hand, engine failure occurs late in the takeoff run, then the speed of the aircraft will likely be too great and the stopping distance left on the runway too little, the only option being to continue the run and hope to become airborne before the aircraft reaches the end of the runway.

The takeoff maneuver can, therefore, be considered to comprise two stages, namely, a first stage during which the run can be safely aborted, and a second stage in which the run must be continued. The instant at which the aircraft transitions between the first and second stages is effectively a point of no return. In the process of performance scheduling and during the actual takeoff procedure, the point of no return is identified only by airspeed, referred to generally as the decision speed, $V_1$. In practice, however, this airspeed is related to a position on the run-way derived from runway allowances during scheduling. The distance to this point, which is, in effect, the distance by which the aircraft will need to achieve $V_1$, if the actual performance achieved during takeoff is to be within the minimum (scheduled) threshold, is referred to herein as the critical distance, $D_{crit}$.

During the actual takeoff, pilots traditionally have had no objective way to assess directly how far they have traveled down the runway, and have been able to measure the progress of the run only through the airspeed achieved. As a result, the decision of whether or not to continue with a takeoff run has been based solely on the speed of the aircraft relative to $V_1$ and, crucially, it does not account for whether the aircraft is operating within performance limits or whether it will have the critical distance upon achieving $V_1$.

Accordingly, current practice is considered satisfactory generally in only two situations. First, during uneventful situations in which the aircraft is performing normally. Second, in situations when the aircraft is performing normally initially, but then suffers a sudden reduction in performance, such as that caused by engine failure. In these cases, acceleration may often be sufficient for the aircraft to operate within the physical constraints of the runway, assuming, of course, that the aircrew is trained to recognize, and respond appropriately to, a discrete and recognizable failure using the $V_1$ criterion.

However, this procedure is not necessarily adequate to insure that there will be enough distance available for the aircraft to complete or terminate the takeoff maneuver if the aircraft is underperforming during the takeoff run. This is particularly relevant in the case of subtle underperformance that may not be noticeable to the crew and may be caused, for example, by dragging brakes, a flat tire, mis-set flaps, or overloading. As acceleration would be less than normal, the aircraft may pass the critical distance before it reaches V. In such circumstances, the $V_1$ criterion may not be sufficient and the safety of the aircraft will be compromised.

Current practice, therefore, needs to be complemented by a way to quantitatively assess the performance of the aircraft, based on the actual distance the aircraft will have traveled during the acceleration phase (for example, up to $V_1$), and then display this performance related information to the pilot. This information may be displayed in conjunction with airspeed, so that the pilot can assess both the performance and progress of the takeoff run simultaneously. In this manner, the pilot will be in a better position to decide whether or not to continue the takeoff maneuver. This is because, by providing quantitative information, the system would not only alert the pilot of any underperformance at a relatively early stage in the takeoff run, but it would also improve confidence in situations where performance is adequate. In addition, takeoff procedures that do not call for a decision speed also lack a way to assess the actual distance the aircraft will have covered at salient moments during the run, such as that of rotation, and, therefore, would similarly benefit from a system for monitoring performance during takeoff.

Accordingly, a system is needed that both monitors performance of an aircraft during its take-off run and displays performance-related information to the pilot.

Various methods of monitoring the progress of the take-off manoeuvre have been proposed previously. Most of these rely on instantaneous measurement to quantify the performance achieved by the aircraft. This information is then either presented directly to the pilot, as in the case of acceleration monitors, resulting in non-predictive monitoring systems, or else used in conjunction with pre-determined characteristics or models to estimate future progress.

Non-predictive monitors can produce only a limited warning of any deterioration of performance. Failing to predict performance further down the take-off run, they can only indicate current performance and, at best, provide 'trend-to-current' information. A quantification of the viability of the run is therefore not directly available. As a result, the crew will have to calculate mentally the implications of the indicated information to estimate whether it is safe to continue the take-off or otherwise. Such mental processing and subsequent decision taking can be demanding, is subject to erroneous conclusions and is consequently not desirable during the take-off manoeuvre.

It is immediately appreciated by those knowledgeable of the art that predictive monitors conceptually provide a much better measure of the viability of the take-off. Predictive monitors are thus preferred. The major hurdle associated with predictive monitors, however, is that an uncertainty is associated with the prediction and it has proved difficult to provide a prediction of performance during take-off that is reliable and accurate. Prediction errors are caused as a result both of the approximations involved in the modelling process and of the errors in the values of the parameters in question, that is, the variation between the actual and the measured or assumed values used. Whereas models that provide a sufficiently accurate representation of the aircraft dynamics have been developed, it is still difficult to estimate or measure with sufficient accuracy the parameters that are used in these equations to predict future performance. In particular, instantaneous measurements of speed and acceleration can include a significant noise content, whilst actual runway friction and aircraft weight, amongst others, can be significantly different from those assumed prior to dispatch and used by prior art systems to estimate aircraft performance. Consequently, the use of instantaneous measurement for the provision of an instantaneous quantification of performance, and the use of assumed values of parameters in performance prediction can result in significant prediction errors. This compromises both the accuracy and the reliability of the instrument.

One example of a prior aircraft take-off monitor, described in U.S. Pat. No. 4,980,833 (Milligan et al), uses five sets of acceleration data to solve an equation of motion having five constants. It then uses that equation to calculate an estimated take-off distance. If the acceleration data includes any significant noise content this can significantly affect the prediction.

Another aircraft monitoring system described in U.S. Pat. No. 4,122,522 (Smith) uses ground based sensors to monitor the velocity of an aircraft as it accelerates along the runway. In this case, the four most recent sets of velocity data are used to solve an equation having four constants, which is then used to calculate an estimated take-off distance. As in U.S. Pat. No. 4,980,833, if the velocity data includes any significant noise content this can significantly affect the prediction.

Prior art monitoring systems have also frequently failed to provide the pilot with information regarding the aircraft's performance in a way that is appropriate and easily assimilated. In some cases, the information has been displayed in an over-complicated manner that is difficult to interpret whilst engaged in the high workload environment of the take-off manoeuvre. These include displays in which a number of indicators or symbols, moving independently, describe a situation. With such displays, the relative positions of the indicators or symbols translate into a measure of viability of the take-off. This may prove to be a complex task to the pilot in adverse conditions, leading to ambiguity or misinterpretation. In other cases, the information may not translate unequivocally into a particular situation and may, therefore, also be misleading. This may be the case with an analogue acceleration display, which, displaying instantaneous acceleration, does not clearly indicate the viability of the run in marginal and dynamic conditions. In fact, in such cases, the pilot would need to integrate the information mentally to assess the performance of the aircraft. In yet other cases, the information has been reduced to a simple stop/go indication, which denies the pilot any discretion and fails to provide sufficient quantitative information.

One example of a prior art display, described in U.S. Pat. No. 5,047,942 (Middleton et al), uses a runway graphic and has an aircraft symbol to show the position of the aircraft on the runway. Other graphics indicate the calibrated airspeed, the rotation velocity $V_R$ and the position on the runway where it is estimated $V_R$ will be achieved, the value of $V_1$ and the estimated position where $V_1$ will be achieved, the ground roll limit, the health of the engines, the wind speed and direction, the engine pressure ratio setting and the second segment climb speed. The display is inevitably complicated and difficult to assimilate.

OBJECTS AND SUMMARY OF THE INVENTION

Accordingly, it is an object of the present invention to provide a method and system for monitoring aircraft performance during the take-off maneuver that not only provides specific and accurate information to the pilot regarding actual performance of the aircraft, but also in a manner that is appropriate and may be easily assimilated.

According to one aspect of the present invention, there is provided a method of monitoring performance of an aircraft during the take-off maneuver, the method including the steps of monitoring the progress of the take-off maneuver by acquiring data representative of the aircraft's motion at a plurality of points during the maneuver, generating a function, or functions, that best fits the acquired data, and using the generated function, or functions, to predict future progress of the maneuver. The method may also include steps in which instantaneous performance is measured repeatedly and the data sets stored to generate a performance history of the present take-off run that may be considered continuous. This history may then be used to estimate the actual performance profile of the aircraft during take-off. The generated function, or functions, may, of course, be constrained, for example, to best describe the aircraft's dynamics or to take into account any disturbance(s) that may be encountered during the take-off run.

By using the performance history of at least part of the present run, the method is capable of obtaining a more accurate estimate of the actual parameters affecting the performance of the aircraft than if it were to rely on data of past runs or estimated prior to take-off. Moreover, the step of obtaining a best fit further reduces the effect of errors associated with these parameters.

By predicting the future progress of the run on the basis of the history of the run to that moment, the method is able to provide an early and reliable indication of circumstances that might assist in the decision to abandon the take-off attempt. These include the subtle effects of under-performance, which might not otherwise be apparent to the crew. Such information allows the crew time in which to assess the take-off situation before the aircraft reaches the critical distance $D_{crit}$. This method is sufficiently robust that transient fluctuations in the acceleration of the aircraft, such as may be caused, for example, by control inputs, running through standing water on the runway or gusts of wind, do not adversely affect the prediction. The method, therefore, is more reliable than those relying on instantaneous measurement and provides an effective, continuous, real-time indication of the performance of the aircraft to significantly enhance the safety of the take-off manoeuvre.

The future performance may be predicted using the coefficients determined by the best fit. The method may include extrapolation of the fitted function but may also include other techniques. The coefficients may, for example, be used to determine yet other coefficients in functions that also describe the motion of the aircraft and therefore can be used to predict future performance.

Advantageously, the progress of the take-off run is monitored by collecting data representing the speed of the aircraft and either the distance travelled from the start of the run or the time of measurement. Preferably, the speed of the aircraft and the distance travelled from the start of the run are determined by sensing the acceleration of the aircraft and integrating accordingly with respect to time. The acceleration and/or speed may be sensed using the aircraft's existing inertial reference system, thereby avoiding the need for additional measuring devices. Alternatively, some other quantity may be sensed directly, such as the ground speed, the airspeed or the distance travelled, or other devices used to measure the acceleration.

Advantageously, the function is extrapolated to predict the distance the aircraft will have travelled by the time it reaches a predetermined speed, and the predicted distance is compared with a predetermined distance. Preferably, the predetermined speed is the decision speed $V_1$ and the predetermined distance is the critical distance $D_{crit}$.

The achieved performance of the run may be measured by a process of curve-fitting using, for example, the least-squares method, although other techniques may be used. Preferably, a second order polynomial function is fitted to data representing the monitored progress of the run. However, higher order polynomial functions or other functions may also be fitted to the curve.

Preferably, predetermined limits are placed on the coefficients of the polynomial function, to prevent excessive fluctuations in the predicted performance being caused by any transient effects.

Compensation may be applied to the polynomial function to adjust its curvature, so as to take account of known speed-dependent effects, for example the speed-dependent reduction in thrust of a propeller-driven aircraft.

The data representing the monitored progress of the run may be weighted to increase the dependence of the curve-fitting function on more recently acquired data. The prediction of performance will then be influenced more by the recent performance than the earlier performance, and so will reflect more rapidly any changes in performance. Further, the data representing an initial portion of the run may be disregarded during calculation of the curve-fitting function, so that the prediction is not unduly influenced by inconsequential data collected at the start of the run, before the aircraft's motion and the thrust of the engines have stabilised.

Advantageously, the uncertainty in the predicted progress of the take-off run is calculated. The uncertainty calculation may be used to control the performance indication: for example, the display may be cancelled, or an indication made, if the prediction is too uncertain to be meaningful. Alternatively, the degree of uncertainty may be shown in the display.

The indication of the aircraft's performance preferably includes indicia representing the magnitude and sign of the comparison of the predicted progress with a predetermined standard. The indication of the aircraft's performance maybe displayed in association with an indication of the aircraft's airspeed and any other parameter that may be considered relevant. This makes the information easy to assimilate and provides the crew with vital information concerning the performance of the aircraft, without placing excessive demands on their ability to scan, assimilate and process data. Thus the display represents the actual performance relative to a datum performance, that datum being, for example, the scheduled performance. In operation, the take-off monitoring system combines the indication of progress from the airspeed indicator with an indication of performance from the take-off monitor to confirm that the aircraft is performing within the provisions of performance scheduling and thus within the regulatory margins of safety.

Data collected during the monitoring process may be recorded for later analysis, so allowing ground staff to assess the performance of the aircraft and to identify any anomaly or trend, so that any necessary remedial engineering or operational action can be taken.

According to a further aspect of the invention there is provided a system for monitoring the performance of aircraft during take-off, the system including data acquisition means, a data processing device and a display device, the system being constructed and arranged to operate according to a method as defined by the preceding statements of invention.

According to a further aspect of the invention there is provided a system for monitoring the performance of an aircraft during the take-off manoeuvre, the system including data acquisition means, a data processing device and a display device, the system being constructed and arranged to monitor the progress of the take-off manoeuvre whereby, during operation, the data acquisition means acquires data representing the motion of the aircraft at a plurality of points during the manoeuvre, the data processing device generates a function that best fits the acquired data, and the data processing device uses the generated function to predict the future progress of the manoeuvre The data acquisition means may include accelerometers, airspeed measurement means and preferably includes the aircraft's inertial reference system.

The display device may include an analogue- or digitally-generated visual display and is preferably associated with the aircraft's airspeed indicating system.

The system may include a data recording device for recording data collected during the monitoring process.

According to a further aspect of the invention there is provided a display device for an aircraft performance monitor, the display device including an indicator element that, in use, extends from a first position representing a scheduled level of performance to a second position representing an achieved level of performance, the length and direction of extension of the indicator element representing respectively the magnitude and sign of the difference between the scheduled performance and the achieved performance.

The indicator element may include a bar-like element of variable length, which may be constructed and arranged to change colour according to the difference between the scheduled performance and the achieved performance. Advantageously, the indicator includes or is located adjacent to a graduated scale. The display device may be located adjacent an airspeed indicator.

BRIEF DESCRIPTION OF THE DRAWINGS

A specific, illustrative system, method and device, in accordance with the present invention will now be described with reference to the accompanying drawings, in which.

The same numerals are used throughout the drawing figures to designate similar elements. Still other objects and advantages of the present invention will become apparent from the following description of the preferred embodiments.

DETAILED DESCRIPTION OF THE PREFERRED EMBODIMENTS

Figure 1:
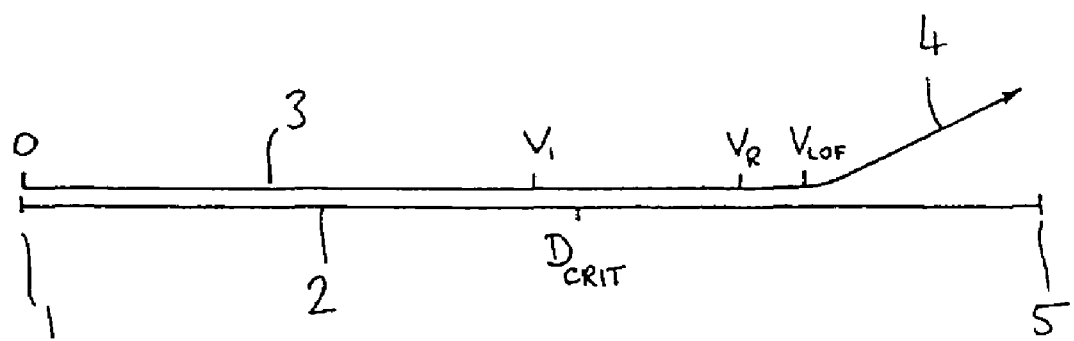
FIG. 1 is a schematic view showing selected speed and distance data for a typical take-off maneuver.

Referring now to the drawings and, more particularly, to FIGS. 1–6d, there is shown generally a specific, illustrative system, method and device for monitoring aircraft performance during take-off and like maneuvers, in accordance with the present invention. According to one embodiment, illustrated schematically in FIG. 1, some of the key speeds and distances in a typical take-off maneuver are shown. An aircraft, for instance, starts at rest at a beginning 1 of a runway 2. Take-off thrust is set, the brakes are released, and the aircraft begins to accelerate 3 along the runway.

The aircraft continues to accelerate down the runway, eventually reaching the rotation speed $V_R$, at which the nose of the aircraft is raised to the take-off attitude, followed moments later by the lift-off speed $V_{LOF}$, when the aircraft lifts off the ground and starts to climb 4. Obviously, the aircraft must leave the ground before it reaches the end 5 of the runway, defined by the Take-off Run Available, TORA.

If the aircraft suffers an engine failure or some other problem that might jeopardise safety of the flight, the pilot may decide to abandon the take-off. However, the take-off can only be abandoned during the first part of the take-off run, before the aircraft has passed the critical distance $D_{crit}$, indicated in current procedure by attainment of the decision speed, $V_1$. Once the aircraft has passed that point it will be travelling too fast and will have too little distance available in which to stop before reaching the end of the runway 5, defined by the Accelerate-Stop Distance Available, ASDA, and the take-off must therefore be continued.

In the present invention, it is assumed that if the aircraft is to achieve the lift-off speed $V_{LOF}$ before it reaches the end 5 of the runway, TORA, it must attain the decision speed $V_1$ by the time it reaches the critical distance $D_{crit}$. This is in agreement with current procedure and performance scheduling. If it is apparent that the aircraft will not attain the decision speed $V_1$ before it has travelled the critical distance $D_{crit}$, the crew need to be informed as early as possible so that they can take the appropriate action. Normally, the aircraft will attain the decision speed $V_1$ before it has travelled the critical distance $D_{crit}$.

In the present invention, the performance of the aircraft is monitored substantially continuously during the take-off run, by monitoring the speed and the distance it has travelled from the beginning of the run. These measurements are stored and then used to predict, by a process of extrapolation, the distance the aircraft will have travelled by the time it reaches the decision speed $V_1$. This distance may, of course, be determined by techniques other than extrapolation. The predicted distance $D_1$ is then compared with the critical distance $D_{crit}$ and the difference information is presented to the pilot.

Figure 2:
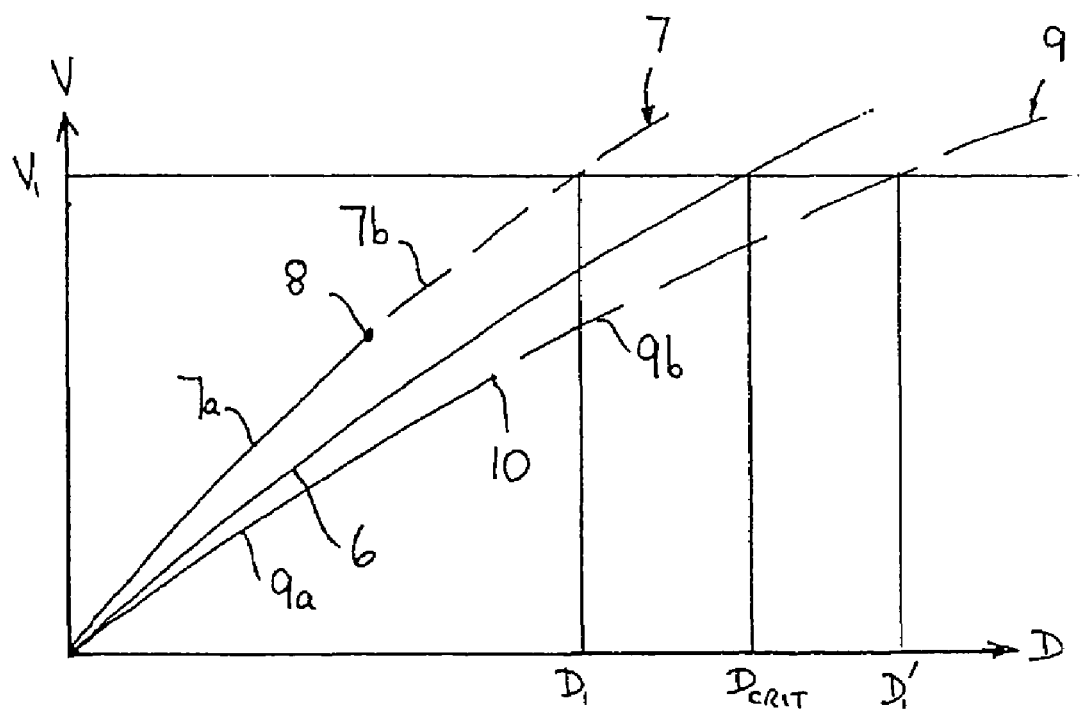
FIG. 2 is a graph of speed vs. distance during take-off for aircraft having varying performance characteristics.

The process described above is illustrated in FIG. 2. FIG. 2 is a graph of the aircraft's airspeed V against the distance D it has travelled down the runway. The decision speed $V_1$ and the critical distance $D_{crit}$ are marked.

The central line 6 represents a performance curve that is just sufficient to achieve the decision speed $V_1$ at the critical distance $D_{crit}$, assuming that the performance of the aircraft remains constant throughout the take-off run. It can be seen that the speed increases from V=0 at D=0 to $V_1$ at $D_{crit}$. This is representative of the scheduled performance and curve 6, therefore, represents a minimum acceptable performance of the aircraft during take-off.

The graph includes a second line 7 that represents the average expected performance of an aircraft during a normal take-off. It can be seen that the average expected performance curve is significantly better than the minimum acceptable (scheduled) performance curve 6.

In this example, the first part 7a of the curve, which is shown as a solid line, represents a set of measurements of V and D made during a take-off run, up to a moment 8 that, in this example, represents the present position and speed of the aircraft. The second part 7b of the curve, shown as a broken line, is an extrapolation (prediction), which represents the future progress of the aircraft as it accelerates up to the decision speed $V_1$. It can be seen that according to the extrapolation, the decision speed $V_1$ will be reached at a predicted distance $D_1$ where $D_1 < D_{crit}$. This implies that the performance is better than scheduled performance and, therefore, is satisfactory in that there is sufficient space available and adequate performance to ensure safe continuation or termination of the take-off from $V_1$.

The graph in FIG. 2 also includes a third line 9 that represents the progress of an aircraft that is under-performing and has reduced acceleration. It can be seen that the performance depicted by the curve 9 is significantly less than the scheduled performance depicted by curve 6.

In this example, the first part 9a of the curve, which is shown as a solid line, again represents a set of measurements of V and D made during the take-off run, up to a moment 10 that represents the present position and speed of the aircraft. The second part 9b of the curve, shown as a broken line, is an extrapolation (prediction), which represents the future progress of the aircraft as it accelerates towards the decision speed $V_1$. It can be seen that according to the extrapolation, the decision speed $V_1$ will be reached at a predicted distance $D_1'$ where $D_1' > D_{crit}$.

The extrapolation therefore provides an indication that the aircraft will be unable to achieve the decision speed $V_1$ before it reaches the critical distance $D_{crit}$. This implies that there would be insufficient distance available to safely either continue to a safe take-off or to stop from the decision speed, $V_1$. It should be noted that because under-performance is detected well before the aircraft reaches the critical distance $D_{crit}$, the decision could be taken to abandon the take-off while there is still a sufficient length of runway available for the aircraft to be brought safely to a halt.

Figure 3:
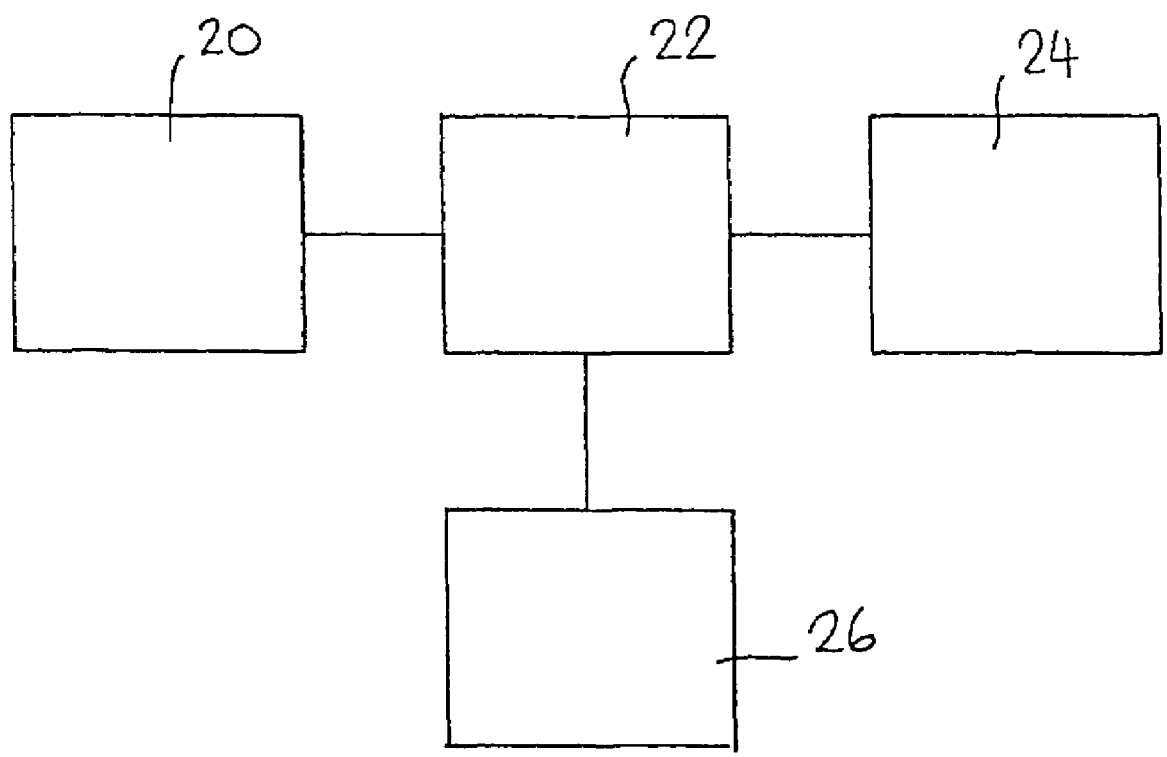
FIG. 3 is a schematic view showing operative components of a monitoring system, according to one aspect of the present invention.

The main components of a monitoring system according to the present invention are shown schematically in FIG. 3. The system includes a data acquisition unit 20, a data processing unit 22, a display device 24 and optionally a data recording device 26, the data processing unit 22 being connected to the other three components. The data acquisition unit 20 may be connected to motion sensing devices, for example accelerometers, which may be part of the aircraft's existing inertial reference system. The data acquisition unit 20 may also be connected to other sensors for detecting variables such as airspeed, engine thrust and so on. Output data from the data acquisition unit is transmitted to the data processing unit 22 for analysis.

The data processing unit 22 consists of a computer or dedicated digital processor. It uses information received from the data acquisition unit 20 to determine the speed and the distance of the aircraft from the start of the take-off run. This may be done for example by integrating the acceleration data to determine the aircraft's speed, and integrating the speed data again to determine the distance travelled. These are routine mathematical processes, which will not be described further. The additional data required by the data processing unit 22 includes the values of the critical distance $D_{crit}$ and the decision speed $V_1$ determined from the aircraft scheduled performance data. That information is input into the unit before the take-off run commences, for example using a keypad, and forms the predetermined reference take-off performance.

The data processing unit 22 applies a curve fitting function to the sets of distance and speed data to optimise the estimation of actual performance. Other techniques may also, of course, be used. The data processing unit 22 then uses the estimation of actual performance, preferably by the method of extrapolation of the calculated estimate, to predict the distance $D_1$ the aircraft will have travelled by the time it reaches the decision speed $V_1$. This predicted distance $D_1$ is compared with the predetermined critical distance $D_{crit}$ and the result of that comparison is displayed on the display device 24. This procedure is repeated continuously at predetermined time intervals using new data collected by the data acquisition unit 20, the display being modified according to the revised prediction of $D_1$ until the speed reaches $V_1$. After that speed is reached, the pilot is committed to the take-off and the display is therefore cancelled.

Preferably, the curve-fitting routine uses the least-squares method and fits a second order polynomial in the form $A+Bx+Cx^2$ to the collected data. Other functions and routines may also, of course, be used. The least-squares method may be weighted to give extra weight to data from the more recent section of the run. This allows the system to react better to changes in the performance of the aircraft, taking less account of data from the earlier and less significant parts of the run. The weighting is preferably based on an exponential function, although other weighting methods might be used. The first few moments of the run, which usually contain transients while the engines are still building up to full thrust and aircraft attitude changes as brakes are released, might be ignored entirely.

In the first few seconds of the take-off run an alternative method of performance monitoring is used to provide a display of performance where the predictive algorithm, presented herein, is not yet operational. This enables a continuous display to be provided from the start of the run. A process of integrating the output of the two methods is a part of the algorithm.

As a further refinement, 'compensation' might be applied to the extrapolation, to increase or decrease the curvature of the fitted curve, so as to reflect the performance characteristics of the aircraft's engines. This may be necessary when, for example, modelling the performance of propeller-driven aircraft, the thrust characteristics of which decrease significantly with increased airspeed. The fitted polynomial, on extrapolation, may not be capable of reflecting this effect on performance further down the run and compensation may therefore be necessary for an accurate prediction. The use and amount of compensation depends on the performance characteristics of the aircraft on which the fit is performed. A process for applying compensation to the extrapolation is described below.

Third or higher order coefficients can be introduced, or bias added to the second order coefficient, to alter the curvature of the predicted curve. The coefficients or bias introduced would typically be derived from theory. When modelling the speed profile of the aircraft with a second order polynomial of the form $A+Bx+Cx^2$ for example, a third order coefficient D may be introduced to create a function of the form $A+Bx+Cx^2+Dx^3$, where D may be a function of any of the coefficients A, B and C. Typically, for a small turbo-prop aircraft, the coefficient D needs to be numerically about $1.6\times10^{-4}$ times the value of B. It should be understood, however, that different ratios and compensation techniques would be appropriate to different aircraft types.

Furthermore, the amount of compensation necessary may need to be varied as the run progresses. This again depends on aircraft type and, for example, for the small turbo-prop would have the form:

$$[(V_{target}-V_{instantaneous})/V_{target}]^{1/2}$$

The system may also include means for estimating the uncertainty in the prediction of $D_1$. This can be achieved through the use of standard statistical tools and specifically derived equations. The estimated degree of uncertainty may be used by the algorithms to discount predictions that fall below a predetermined confidence level, or an indication of the confidence level may be included in the pilot's display.

The optional data recording device 26 records the data generated by the data processing unit 22 for post-flight analysis. This data may be useful for monitoring the performance of the aircraft for engineering or operational purposes.

Figure 4:
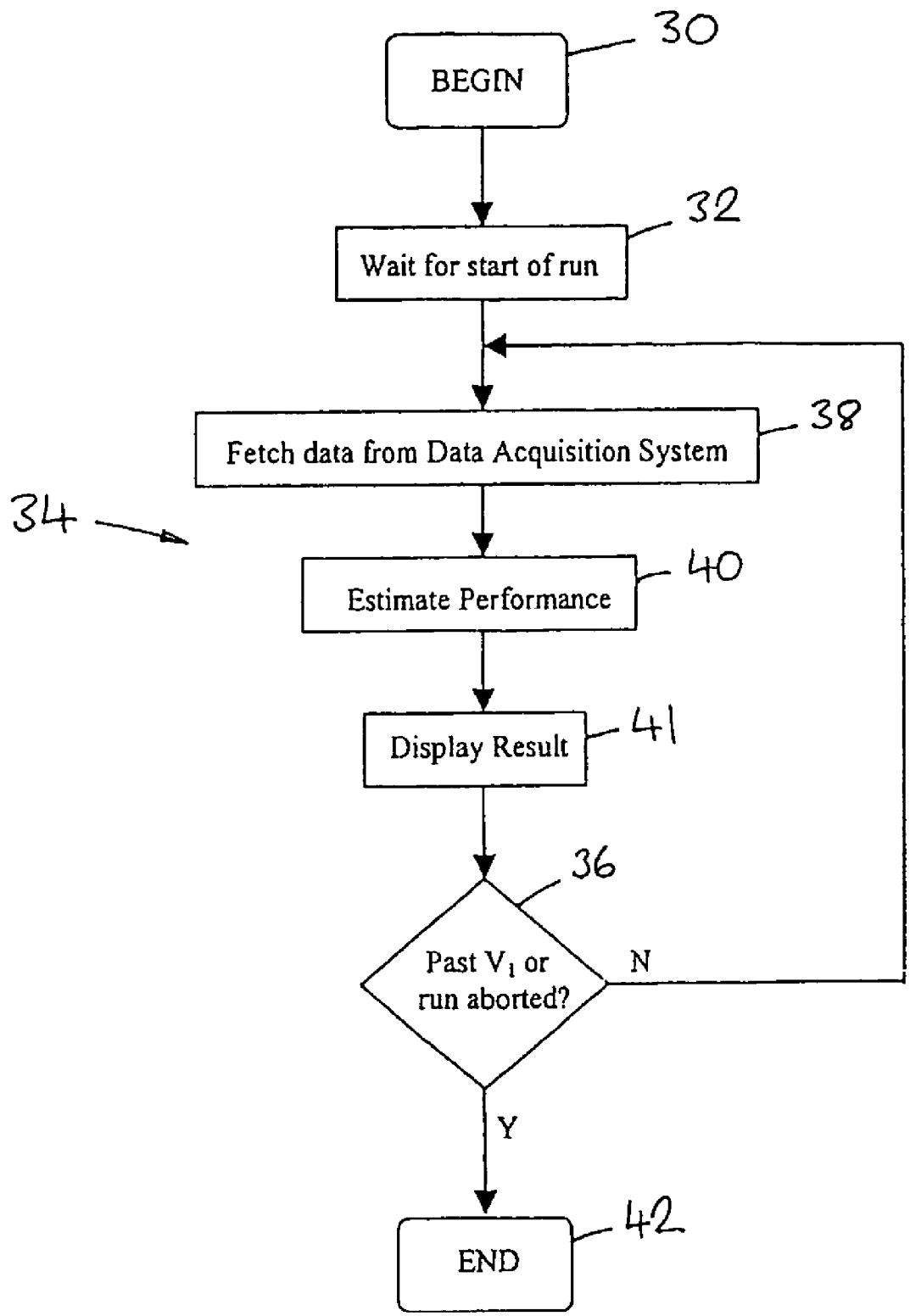
FIGS. 4 and 5 are flow diagrams showing operative steps of a monitoring method, according to one aspect of the present invention.
Figure 5:
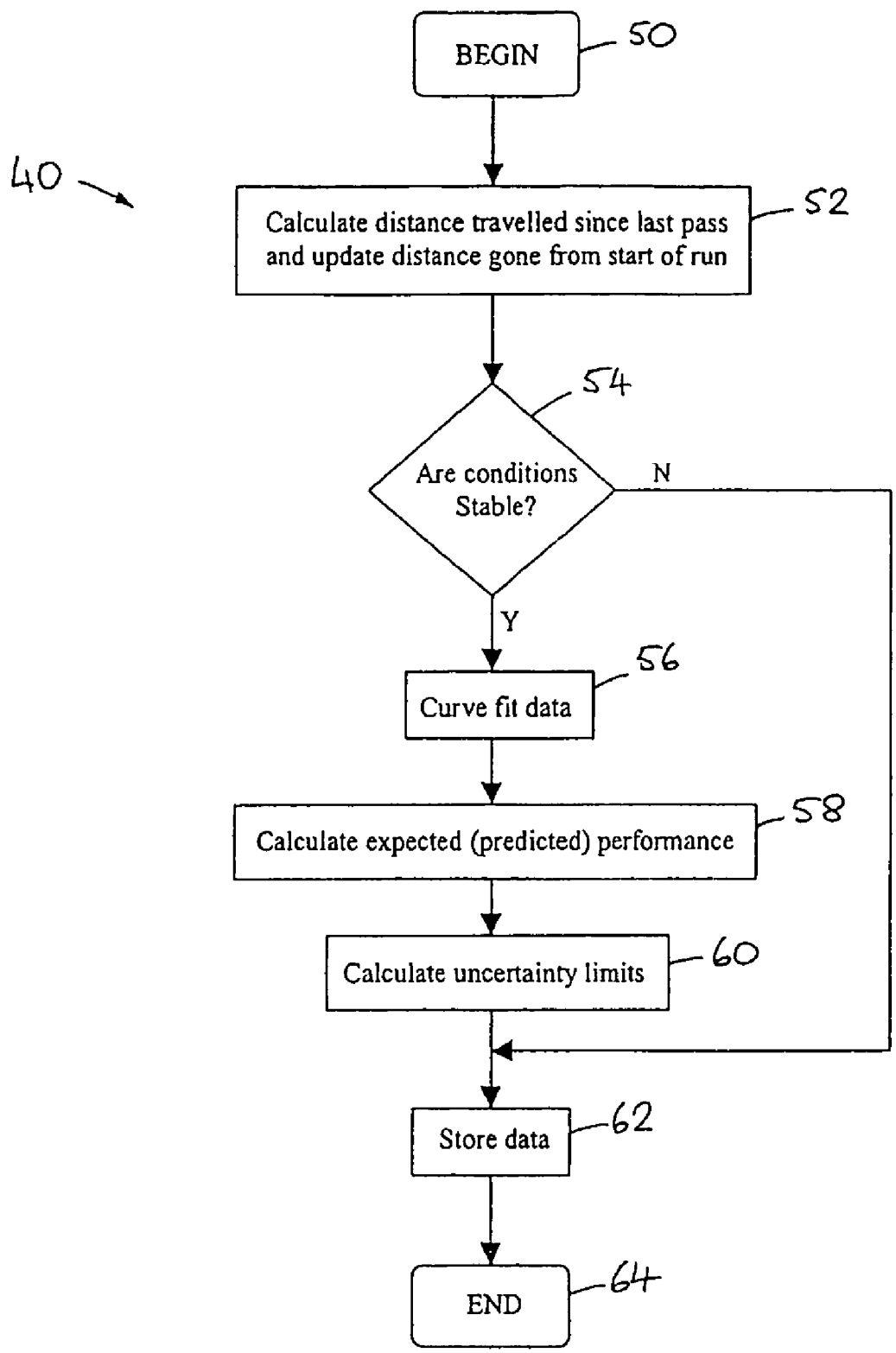

The steps of a computer program for measuring the performance of an aircraft during take-off are illustrated in FIGS. 4 and 5. The steps of the main routine are shown in FIG. 4. The routine begins 30 and it then waits 32 for the run to start. This may be indicated automatically by response to one or more of a variety of parameters such as: release of the brakes, the engine power being above a predetermined level or the acceleration being greater than a predetermined figure. Alternatively, it may be indicated by a manual signal.

Once the start of the run has been detected, a sub-routine 34 is repeated continuously, for example, every 0.1 secs, until either the speed exceeds $V_1$ or the pilot has abandoned the take-off 36. The sub-routine 34 includes the steps: fetching data 38 from the data acquisition system, estimating 40 the performance of the aircraft and displaying the result 41. When the sub-routine 34 ends as determined by the afore-mentioned conditions, the main routine ends 42.

The steps of the performance estimation sub-routine 40 are shown in FIG. 5. As mentioned previously, this sub-routine is repeated until a termination condition is detected. The sub-routine begins 50 and the distance travelled since the last pass is calculated 52. This is preferably achieved by means of a software algorithm that uses a standard integration technique. That distance is then added to the sum of the previous distance calculations to give the total distance travelled since the start of the run.

The first few seconds of the run are not normally used for curve-fitting since this period contains transients associated with rapid rates of change of acceleration, which could compromise the accuracy of the prediction and result in a dynamic display that would be distracting to the pilot. The sub-routine 40 therefore includes a decision step 54, which will inhibit the curve fitting process until stable conditions are sensed. During this time, and until a valid prediction is achieved, an alternative means of monitoring replaces the predictive monitor. This alternative monitoring method may for example be based simply on monitoring the acceleration of the aircraft and comparing that acceleration with a predetermined standard.

Once stable conditions are sensed, the sub-routine applies the curve-fitting algorithm to the captured sets of data 56 and extrapolates the curve to $V_1$, applying compensation if necessary. Next, the expected distance-to-go to $V_1$ is calculated from the compensated extrapolated curve. This distance-to-go is added to the distance gone to generate the predicted value of $D_1$. The predicted value of $D_1$ is compared to the critical distance $D_{crit}$ to provide an indication of performance 58. The uncertainty of the prediction is then calculated 60 in terms of the upper and lower expected limits of $D_1$. This process is repeated typically ten times per second and can thus be considered to be a substantially continuous process.

The data thus calculated is stored 62 in the data recording device 26, after which the sub-routine ends 64.

To summarise, acceleration data is acquired throughout the take-off run, the speed of the aircraft and the distance travelled since the beginning of the run is determined for each of those values by a process of integration, and this data is stored. The sampling rate of typically 10 Hz is high, particularly as compared to the duration of the run (up to 60 seconds) and the response time of the aircraft (a few seconds). Therefore, although the data consists of multiple discrete sets of data (typically several hundred data sets), it represents a substantially continuous history of the run.

The computer then generates a function that is the best fit for the captured data. This is a simple function, for example a second-order polynomial, which is fitted to the data by a curve-fitting process, for example using the least-squares method. Because the function is a relatively simple one having only a few coefficients (three in the case of a second-order polynomial), whereas there are a much larger number of data sets, the function generally does not fit the data exactly and the fitted curve does not pass through all the data points. As a result, the curve fitting process tends to have a smoothing effect that cancels out any noise component of, or a discrete disturbance in, the data, so that the fitted function accurately represents the trend of the data. This allows an accurate and reliable estimate of the actual performance to be calculated. This estimate is then used to generate a reliable prediction of the future progress of the run.

For the curve fitting process to be effective, it is essential for there to be more data sets than there are coefficients in the fitted function. Thus, where X is the number of data sets and Y is the number of coefficients, X>Y and preferably X>>Y (for example, X>10Y). There is therefore a redundancy in the data used to determine the fitted function.

Once the function has been generated, it is used to predict future performance. In the preferred embodiment, the function is extrapolated to predict the distance $D_1$ that will be required for the aircraft to reach the decision speed $V_1$. The predicted distance $D_1$ is then compared with the critical distance $D_{crit}$ to provide an indication of the aircraft's performance. The fitted function may, however, also be used to determine the coefficients of a different function that is then used to predict performance.

A cockpit display device for indicating the performance of an aircraft is shown in FIGS. 6a to 6d. In this example, the display device is a computer-driven digital display generated using, for example, a cathode-ray tube or flat-screen display. It should be understood, however, that separate discrete instruments may also be used.

Typically, the performance display device 80 is located alongside a conventional airspeed indicator 82, which may include a digitally generated airspeed 'tape' 84 carrying airspeed markings 86. Typically, the tape moves vertically past a stationary pointer 88 as the speed increases or decreases, the pointer 88 indicating the current speed. A small arrow 90 is normally provided to indicate the direction in which the speed is changing (an arrow pointing upwards indicating that the speed is increasing).

The proposed performance display device 80 displays the performance information quantitatively in the form of a bar 94. This typically extends upwards or downwards from a reference mark 96, associated with minimum acceptable (scheduled) performance and aligned with pointer 88, on the airspeed tape. Also included is a graduated scale 92 that extends vertically, alongside the bar 94, the scale providing a means of assessment of the performance of the current run. Advantageously, this allows the pilot to compare the current performance with the performance distribution expected of aircraft of that type operating under the same conditions. Comparison is made by reference to the length and colour of the bar 94, according to the comparison of the predicted distance $D_1$ to the critical distance $D_{crit}$. When $D_1 < D_{crit}$ the bar will be green and will extend upwards, and when $D_1 > D_{crit}$ the bar will be red and will extend downwards. The length of the bar is proportional to the difference between $D_1$ and $D_{crit}$. Thus the monitor displays the actual performance of the aircraft relative to a predetermined datum performance such as, for example, the scheduled performance.

The scale 92 preferably consists of four graduation marks. The reference graduation mark 96 is located opposite the speed pointer 88 and indicates the datum 'scheduled' performance level. The graduation 98 refers to 'average expected' performance, normally five standard deviations above 'scheduled' performance. Graduation 100 is set midway between graduations 96 and 98 and graduation 102 is set a similar distance above 98 as 100 is below 98. Graduations 100, 98 and 102 may be joined by a vertical bar to form a bracket 104. The bracket thus encloses the performance range of average expected performance +/−2½ standard deviations, which encompasses 98% probability. Alternative graduations to those depicted in FIG. 6 may, of course, be used.

Figure 6A:
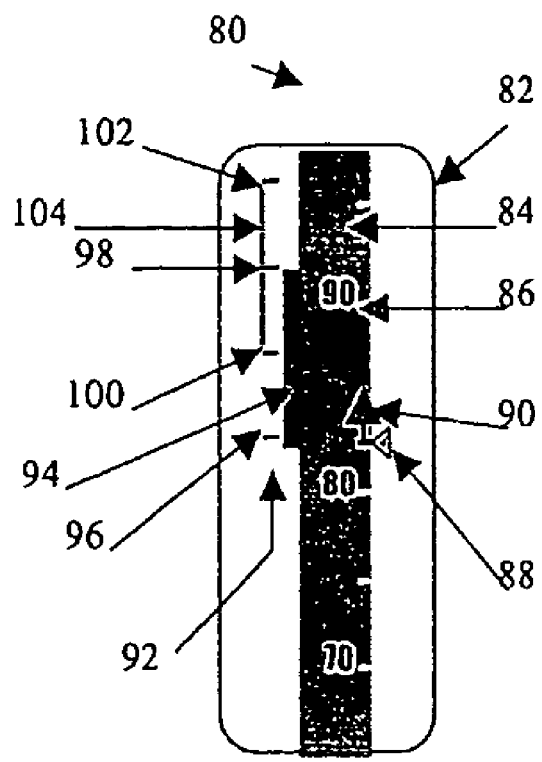
FIGS. 6a–6d is a plan view of a specific, illustrative cockpit display device, according to the present invention.
Figure 6B:
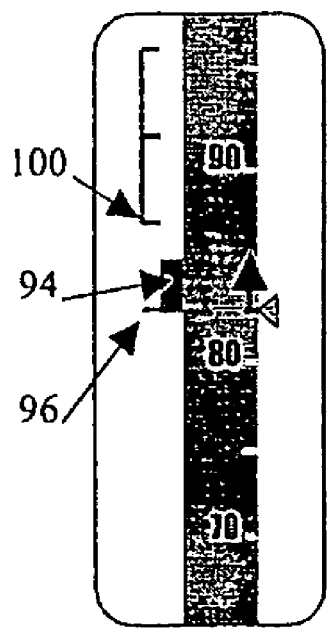
Figure 6C:
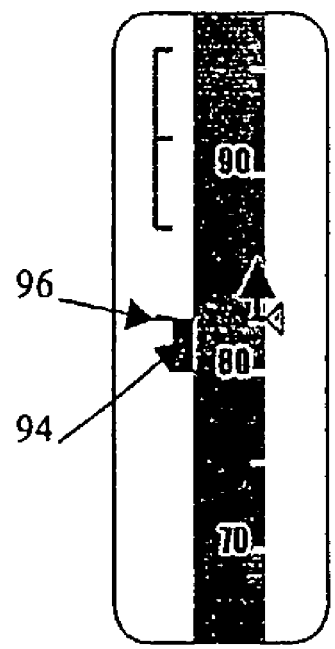
Figure 6D:
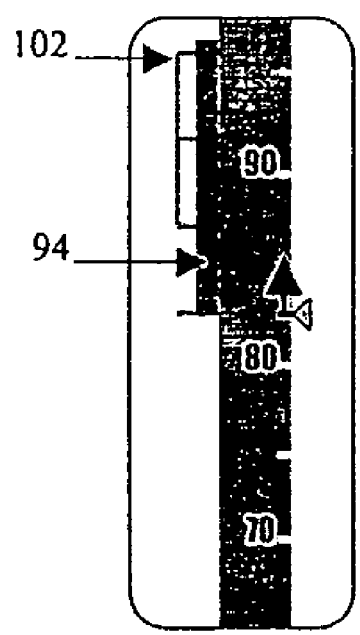

When the aircraft is performing normally and average performance is predicted, the bar 94 will be green in colour and will extend upwards from the reference graduation 96 to the average performance graduation 98 on the scale, as shown in FIG. 6a. Indications of performance anywhere inside the bracket 104 would be regarded as satisfactory. If the performance is predicted to be less than the 98 percentile range but better than scheduled performance, a green bar 94 extends upwards from the reference graduation 96 as shown in FIG. 6b. This indicates that the performance is low but still better than regulatory minimum; however, the reason for the low performance should be investigated. Should the performance be less than scheduled performance, the bar 94 is coloured red and it extends downwards from the reference graduation 96, FIG. 6c. This shows that the predicted performance is below the regulatory minimum (scheduled) and the aircraft is not accelerating sufficiently rapidly to achieve $V_1$ before it reaches $D_{crit}$, potentially resulting in a situation where there may be insufficient runway available to safely terminate the manoeuvre from $V_1$. Red indications, therefore, would inform the pilot that the performance is below regulatory minimum acceptable standard and that he or she should take the appropriate action. If the performance is predicted to be greater than the 98 percentile range then the green bar extends upwards from the reference graduation 96 beyond graduation 102 as shown in FIG. 6*d*. This would show an anomaly in performance that should be investigated.

Advantageously, as well as indicating an instantaneous estimate of the performance of the aircraft, the indication also allows the crew to monitor any change or trend in performance, by observing the direction and rate of change of the indicator bar 94. Thus, for example, if the floating edge of the bar 94 is moving upwards, the performance is improving, whilst a downward trend shows a decreasing performance.

Further options in colour and colour changes and in the graduations of the monitor display might be introduced depending on operational and regulatory issues and experience.

Other indicia, such as that indicating the speed that will be attained at the critical distance, may also be included in forms appropriate to current practice.

Further, instead of predicting the distance gone at $V_1$, it is possible to use the inverse of this approach by predicting the speed at the critical distance $D_{crit}$ and comparing the predicted speed with a predetermined speed (for example, $V_1$).

Various modifications and alterations to the invention may be appreciated based on a review of this disclosure. These changes and additions are intended to be within the scope and spirit of the invention as defined by the following claims.

What is claimed is:

1. A method of monitoring performance of an aircraft during a takeoff maneuver, the method including the steps of monitoring progress of the maneuver by acquiring a plurality of data sets representative of the aircraft's motion at a plurality of points during the maneuver, generating a function that best fits the acquired data sets, and using the function generated to predict future progress of the maneuver.

2. The method set forth in claim 1, further including the steps of comparing the predicted progress with a predetermined standard and providing an indication of the performance based on the comparison.

3. The method set forth in claim 2, wherein the indication of the aircraft's performance includes indicia representing the magnitude and sign of the comparison of the predicted progress with the predetermined standard.

4. The method set forth in claim 1, wherein the function generated is extrapolated to predict the future progress of the maneuver.

5. The method set forth in claim 1, wherein the function generated is used to determine coefficients of a second function, which is used to predict the future progress of the maneuver.

6. The method set forth in claim 1, wherein the function generated is derived by a process of curve-fitting using a least squares method.

7. The method set forth in claim 6, wherein a second order polynomial function is fit to the acquired plurality of data sets representing the monitored progress of the maneuver.

8. The method set forth in claim 7, wherein predetermined limits are placed on the coefficients of the polynomial function.

9. The method set forth in claim 6, wherein compensation is applied to the curve-fitting function to adjust its curvature.

10. The method set forth in claim 1, wherein an alternative method of monitoring performance is employed during an initial part of the takeoff maneuver.

11. The method set forth in claim 1, wherein uncertainty in the predicted progress of the takeoff maneuver is calculated.

12. The method set forth in claim 11, wherein the uncertainty calculation is used to control the performance indication.

13. The method set forth in claim 1, wherein data collected during monitoring is recorded for later analysis.

14. The method set forth in claim 1, wherein X data sets are collected during the takeoff maneuver and used to generate a function having Y coefficients, where X>Y.

15. The method set forth in claim 1 performed by a system constructed and arranged for monitoring the performance of an aircraft during the takeoff maneuver, the system including a data acquisition unit, a data processing device and a display device.

16. A system for monitoring the performance of an aircraft during a takeoff maneuver, the system including a data acquisition unit, a data processing device and a display device, the system being constructed and arranged so as to monitor progress of the takeoff maneuver, wherein, during operation, the data acquisition unit acquires a plurality of data sets representative of the motion of the aircraft at a plurality of points during the maneuver, the data processing device generates a function that best fits the acquired data sets and the data processing device uses the function generated to predict future progress of the maneuver.

17. The system set forth in claim 16, being further constructed and arranged for comparing the predicted progress with a predetermined standard and for providing an indication of the performance based on the comparison.

18. The system set forth in claim 16, further including a data recording device for recording data collected during monitoring.

19. The system set forth in claim 16, wherein the collected data sets from successive measurements are stored and used to determine, by curve fitting, the achieved performance of the aircraft.

20. The system set forth in claim 16, wherein X data sets are collected during the takeoff maneuver and used to generate a function having Y coefficients, where X>Y.

21. A system for monitoring the performance of an aircraft during a takeoff maneuver, the system including a data acquisition unit, a data processing device and a display device, the system being constructed and arranged so as to monitor progress of the takeoff maneuver, wherein, during operation, the data acquisition unit acquires a plurality of data sets representative of the motion of the aircraft at a plurality of points during the maneuver, the data processing device generates a function that best fits the acquired data sets, and the data processing device uses the function generated to predict future progress of the maneuver, the display device including an indicator element that, in use, extends from a first position representing a scheduled level of performance to a second position representing an achieved level of performance, the length and direction of the indicator element representing, respectively, the magnitude and sign of the difference between the scheduled performance and the achieved performance.

22. The system set forth in claim 21, wherein the indicator element includes a bar-like element of variable length.

23. The system set forth in claim 21, wherein the indicator element is constructed and arranged so as to change color according to the difference between the scheduled performance and the achieved performance.

24. The system set forth in claim 21, wherein the indicator element is located adjacent to a graduated scale.

25. The system set forth in claim 21 located adjacent to an airspeed indicator.

* * * * *